US011848596B2

(12) United States Patent
Hoffman et al.

(10) Patent No.: US 11,848,596 B2
(45) Date of Patent: Dec. 19, 2023

(54) ELECTROMECHANICAL ACTUATORS WITH MAGNETIC FRAME STRUCTURE AND METHODS THEREOF

(71) Applicant: New Scale Technologies, Inc., Victor, NY (US)

(72) Inventors: Conrad R. Hoffman, Canandaigua, NY (US); Robert Culhane, Pittsford, NY (US); Qin Xu, Pittsford, NY (US); David A. Henderson, Farmington, NY (US)

(73) Assignee: New Scale Technologies, Inc., Victor, NY (US)

( * ) Notice: Subject to any disclaimer, the term of this patent is extended or adjusted under 35 U.S.C. 154(b) by 50 days.

(21) Appl. No.: 17/082,831

(22) Filed: Oct. 28, 2020

(65) Prior Publication Data

US 2021/0126519 A1 Apr. 29, 2021

Related U.S. Application Data

(60) Provisional application No. 62/927,000, filed on Oct. 28, 2019.

(51) Int. Cl.
*H02K 41/03* (2006.01)
*H02K 11/33* (2016.01)
*H02K 11/21* (2016.01)
*H02K 11/20* (2016.01)

(52) U.S. Cl.
CPC ........... *H02K 41/031* (2013.01); *H02K 11/20* (2016.01); *H02K 11/21* (2016.01); *H02K 11/33* (2016.01)

(58) Field of Classification Search
CPC ...... H02K 41/031; H02K 41/02; H02K 11/21; H02K 11/20; H02K 11/33; H02K 33/18; H02K 35/04; F16K 31/52483
USPC .......... 310/12.18, 12.19, 12.15, 12.31, 12.32
See application file for complete search history.

(56) References Cited

U.S. PATENT DOCUMENTS

| 4,410,428 A * | 10/1983 | Cooper ............. F16K 31/52483 |
| | | 137/625.29 |
| 2010/0072924 A1* | 3/2010 | Shoda ....................... H02P 5/74 |
| | | 318/135 |
| 2012/0080960 A1* | 4/2012 | Neff .......................... H01F 5/00 |
| | | 29/605 |
| 2012/0119593 A1* | 5/2012 | Yajima ................. H02K 41/031 |
| | | 310/12.21 |
| 2017/0012519 A1* | 1/2017 | Neff .................... G01D 5/34753 |

* cited by examiner

*Primary Examiner* — Michael Andrews
(74) *Attorney, Agent, or Firm* — Troutman Pepper Hamilton Sanders LLP (Rochester)

(57) ABSTRACT

An actuator assembly includes one or more conductive coils each positioned in a movable supporting frame configured to be coupled to a load. A pair of permanent magnets are located on each side of each of the coils to provide opposite polarity magnetic fields to each of the coils. A drive circuit is coupled to the each of coils and configured to supply a drive current to each of the conductive coils. A controller is coupled to each of the coils through the drive circuit and is configured to independently control the drive current supplied to each of the coils to provide movement of the supporting frame to provide a force to the load, based on the opposite polarity fields and the drive current, wherein the movement of the supporting frame is in proportion to an amplitude and polarity of the drive current.

20 Claims, 8 Drawing Sheets

ELECTROMECHANICAL ACTUATORS WITH MAGNETIC FRAME STRUCTURE AND METHODS THEREOF

This application claims benefit of U.S. Provisional Patent Application No. 62/927,000, filed Oct. 28, 2019, the entirety of which is incorporated herein by reference.

FIELD

The present technology generally relates to small electromechanical actuators suitable for actuating valves and other devices. The present technology also relates to arrays of the electromechanical actuators that may be used to drive a plurality of loads, such as valves.

BACKGROUND

To date, numerous small electromechanical actuators have been developed that can be mounted next to each other and used to drive a load. A variety of different types of loads may be driven by these small electromechanical actuators with small valves being an area of particular interest. A significant example of these small valves is the "textile solenoid valve," which is typically rectangular and designed for side-by-side mounting on a manifold. Another example of these small valves are small solenoid valves which typically are round and can be mounted in a similar fashion as described above.

Accordingly, in applications which utilize these small valves, overall miniaturization of the valves and actuators is desired, but actuators have been the limiting factor in achieving a small size. Unfortunately, with the actuator designs to date, none of the existing designs achieve a favorable combination of miniaturization, high packing density, and high-speed operation.

SUMMARY

An electromechanical actuator assembly includes one or more conductive coils each positioned in a movable supporting frame configured to be coupled to a load. A pair of permanent magnets are located on each side of each of the one or more conductive coils, wherein the pair of permanent magnets located on each side of each of the one or more conductive coils are oriented to provide opposite polarity magnetic fields to each of the one or more conductive coils. A drive circuit is coupled to the each of one or more conductive coils and configured to supply a drive current from a current source to each of the one or more conductive coils. A controller is coupled to each of the one or more conductive coils through the drive circuit. The controller is configured to independently control the drive current supplied to each of the one or more conductive coils to provide movement of the supporting frame to provide a force to the load, based on the opposite polarity fields and the drive current, wherein the movement of the supporting frame is in proportion to an amplitude and polarity of the drive current.

A method of making an electromechanical actuator assembly includes providing one or more conductive coils each positioned in a movable supporting frame configured to be coupled to a load. A pair of permanent magnets are located on each side of each of the one or more conductive coils, wherein the pair of permanent magnets located on each side of each of the one or more conductive coils are oriented to provide opposite polarity magnetic fields to each of the one or more conductive coils. A drive circuit is coupled to the each of one or more conductive coils and configured to supply a drive current from a current source to each of the one or more conductive coils. A controller is coupled to each of the one or more conductive coils through the drive circuit. The controller is configured to independently control the drive current supplied to each of the one or more conductive coils to provide movement of the supporting frame to provide a force to the load, based on the opposite polarity fields and the drive current, wherein the movement of the supporting frame is in proportion to an amplitude and polarity of the drive current.

This technology as illustrated and described with the example herein, provides a number of advantages including providing a small actuator assembly that provides for a high packing density and high-speed operation.

DETAILED DESCRIPTION

Figure 1:
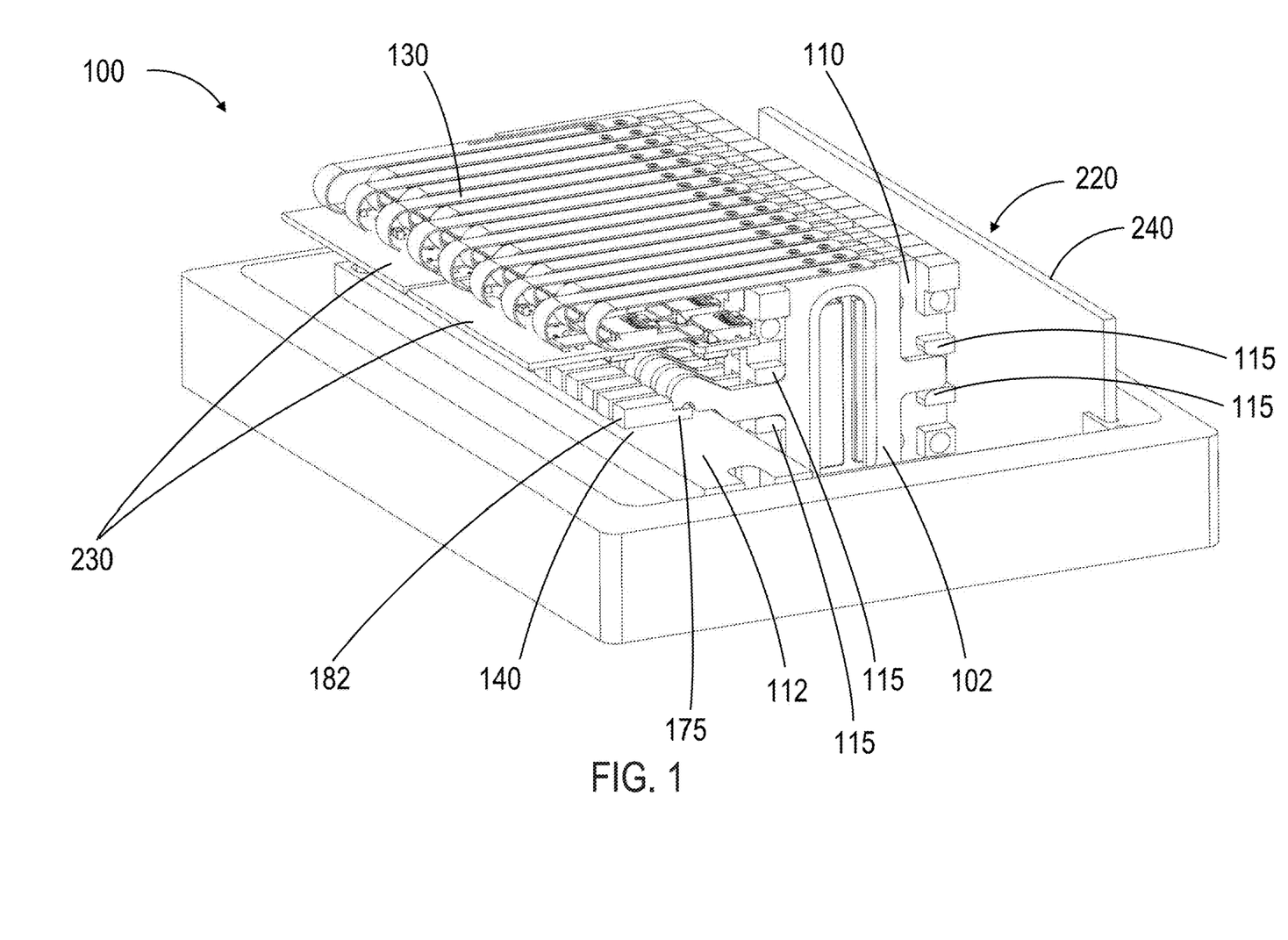
FIG. 1 is an illustration of an exemplary actuator assembly comprising actuators of the present technology coupled to slide valves, and driver boards coupled to a plurality of flexible printed circuits that are configured to be connected to the conductive coils of the exemplary actuator assembly.

An exemplary actuator assembly 100 of the present technology is illustrated in FIG. 1. In this example, the actuator assembly 100 includes one or more linear actuators 102, each coupled to one or more loads 140, which in this example are slide valves, a plurality of permanent magnets 125 located in nesting magnet frames 110, a digital control system 220, a driver board 230, and a power/interface board 240, although the actuator assembly 100 may include other types and/or numbers of additional elements, components, or devices in other combinations. Although slide valves are illustrated and described as the one or more loads 140, the linear actuators 102 of the actuator assembly 100 can be used with other types and/or numbers of loads.

While an individual linear actuator 102 and load 140 (slide valve) are labelled in FIG. 1 to illustrate the motion and coupling of the linear actuator 102 to the load 140, i.e., the valve, as illustrated in FIG. 1, the present technology may be employed with a plurality of electromechanical linear actuators and may be coupled to various types and/or numbers of loads. In one example, the plurality of electromechanical linear actuators may have the same structure and operation as the linear actuator 102. In one example, the technology may be employed with an array of N actuators coupled to N loads, such as valves by way of example only, where N is greater than or equal to one. As discussed below, the array of N actuators have a shared magnetic structure and a flat blade configuration. In one example of the present technology, the actuator assembly 100 includes blocks of 8 actuator/load assemblies. In this example, eight is chosen as N because this is an efficient number for the digital control system 220 for the linear actuators 102, which in that example would be an 8-bit digital control system. However, there is no inherent limit to N and no requirement that the digital control system 220 be limited to 8 bits. The actuator assembly 100 provides a number of advantages including providing a small actuator assembly that provides for a high packing density and high-speed operation.

Figure 2A:
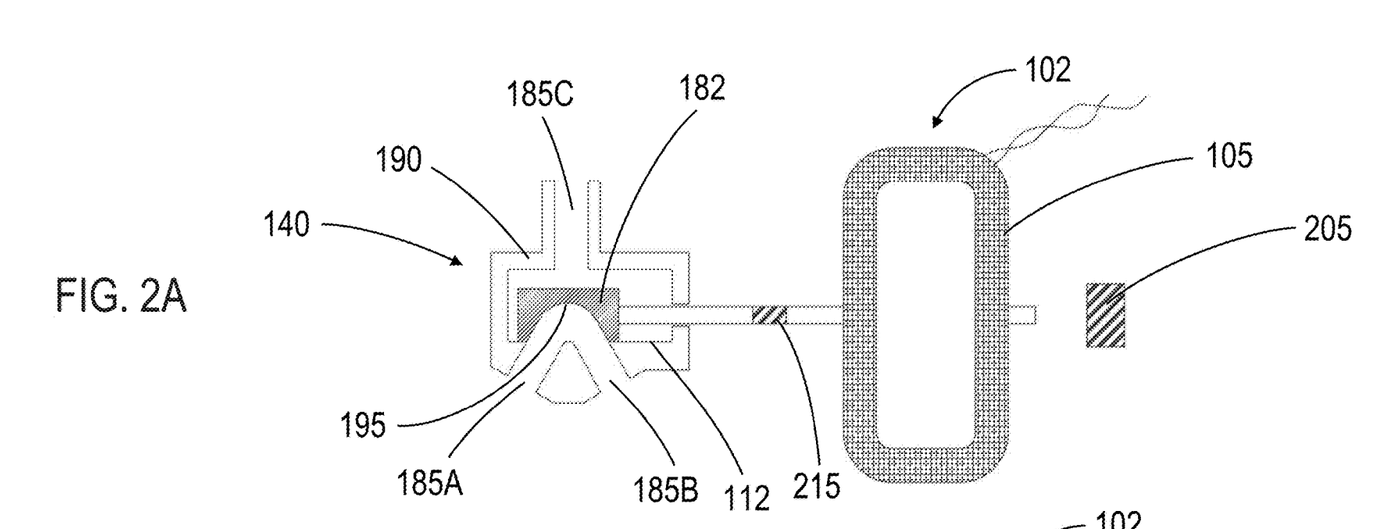
FIG. 2A is a cross-sectional view of the exemplary slide valve of FIG. 1 with angled passages with linear actuator in one actuation location.
Figure 2B:
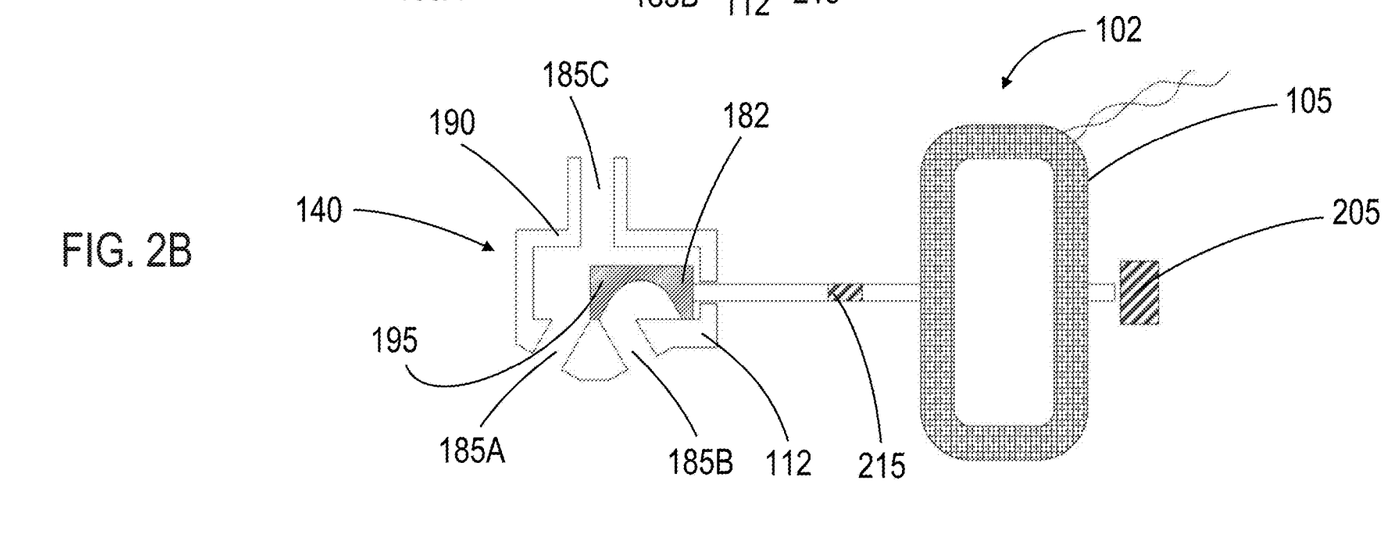
FIG. 2B is a cross-sectional view of the exemplary slide valve of FIG. 1 with angled passages with linear actuator in another actuation location.

Referring now more specifically to FIGS. 2A and 2B, an exemplary slide valve that may be employed as the load 140 is shown in cross-section coupled to the linear actuator 102. In this example, the load (slide valve) 140 includes a valve plate 112 that includes an angled port and a sliding element 182 is coupled to the linear actuator 102, as described below, that covers or uncovers angled passages 185A and 185B in the valve plate 112. The sliding element 182 incorporates a pocket 195 such that flow can occur between adjacent passages 185A and 185B of the angled port when the sliding element 182 is in a position surrounding the passages 185A and 185B as shown in FIG. 2A when the linear actuator 102 is activated to one location. When the linear actuator 102 is activated to another location as shown in FIG. 2B, the flow can occur between inlet passage 185C and passage 185A. The sliding element 182 is coupled to the linear actuator 102 such that force is only applied in the direction of travel, the sliding element 182 being allowed to float in all other directions.

Referring to FIG. 1 and FIG. 2, linear motion of the sliding element 182 is constrained by guides 115, as described below, but is also held in contact with the valve plate 112 by the surrounding manifold 190 pressure, making the sealing force self-adjusting. The sliding element 182 of the valve is fabricated from low friction plastics and runs on smooth metal surfaces to reduce friction and wear. In this example, in which the load 140 is a valve, the leakage rate of the valve depends on the surface finish of the valve body, which should be as smooth as practical and have a lay parallel to the direction of travel. Although an exemplary slide valve is shown as the load 140, the present technology may be employed with any other types of loads configured to be controlled by the exemplary linear actuator 102.

Figure 3:
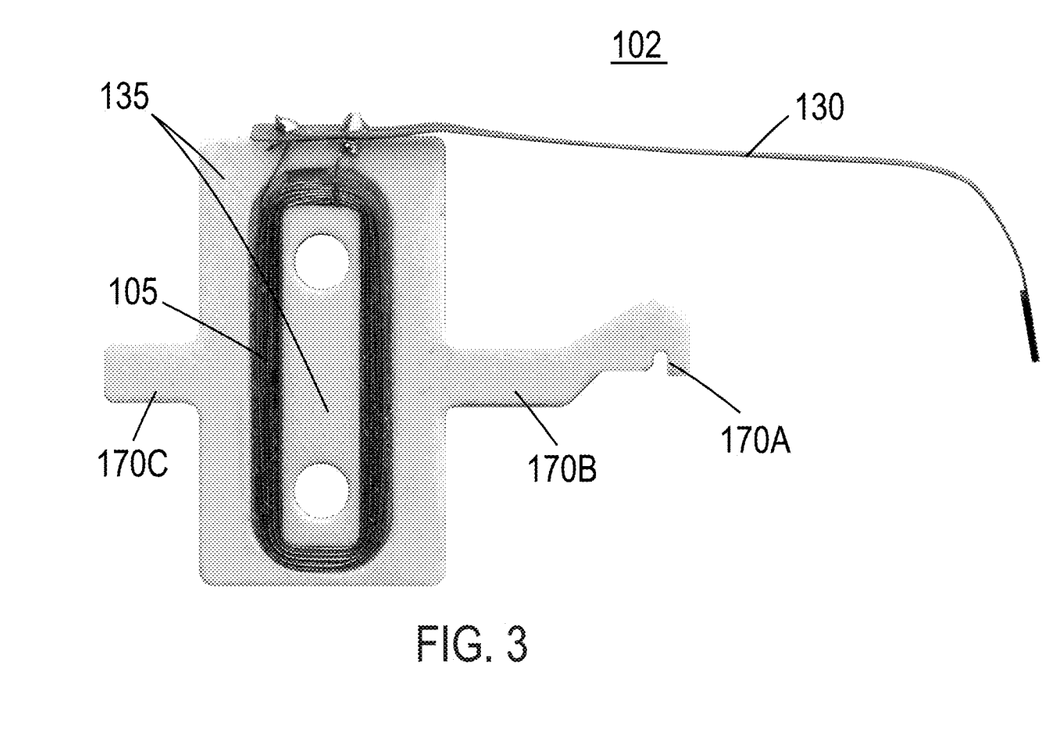
FIG. 3 is an image of an exemplary actuator assembly including a conductive coil located in a coil frame and coupled to a flexible printed circuit.

Aspects of the exemplary actuator assembly 100 of the present technology are illustrated in FIGS. 3-8. As discussed above, any number of linear actuators 102 may be employed in the actuator assembly 100. In this example, the electromechanical actuator assembly 100 includes at least one linear actuator 102 that includes an electrical conductive coil 105 positioned in a coil frame 135 and coupled to a flexible printed circuit 130 as shown in FIG. 3, although the linear actuator 102 may include other types and/or numbers of elements in other configurations. In other examples, as set forth above, the electromechanical actuator assembly 100 may include N electrical conductive coils 105, each separately coupled to a flexible printed circuit 130.

Referring more specifically to FIG. 1 and FIG. 3, in this example the conductive coil 105 is bonded or molded in the coil frame 135. The coil frame 135 is configured to have features 170B and 170C, as shown in FIG. 3, that guide the motion of the electromechanical actuator assembly. The coil frame 135 further has an arm 170A that is configured to couple the coil frame 135 to the load 140, such as a valve, to provide a force to the load 140 during operation, although the coil frame 135 may have other configurations based on other applications or the type of load employed. In this example, the arm 170A on the coil frame 135 is coupled to the valve sliding element 182 (as shown in FIG. 1) through an indented feature 175 to facilitate the sliding element 182 to float in all other directions as described above.

The conductive coil 105 is connected a drive circuit that includes the flexible printed circuit 130 coupled to the driver board 230. The flexible printed circuit 130 of the drive circuit couples the conductive coil to the driver board 230 that routes power to the coil, as discussed in further detail below. The flexible printed circuit 130 is configured to enable provision of a source of an independent current to the conductive coil 105 of the linear actuator 102 to produce independent force and movement of the conductive coil 105 in proportion to current amplitude and polarity according to the Lorentz principle, although other types of drive circuits may be used. In this example, the coil frame 135 as shown in FIG. 3 is fabricated from a low friction plastic to reduce friction and wear, although other materials may be employed.

Figure 4:
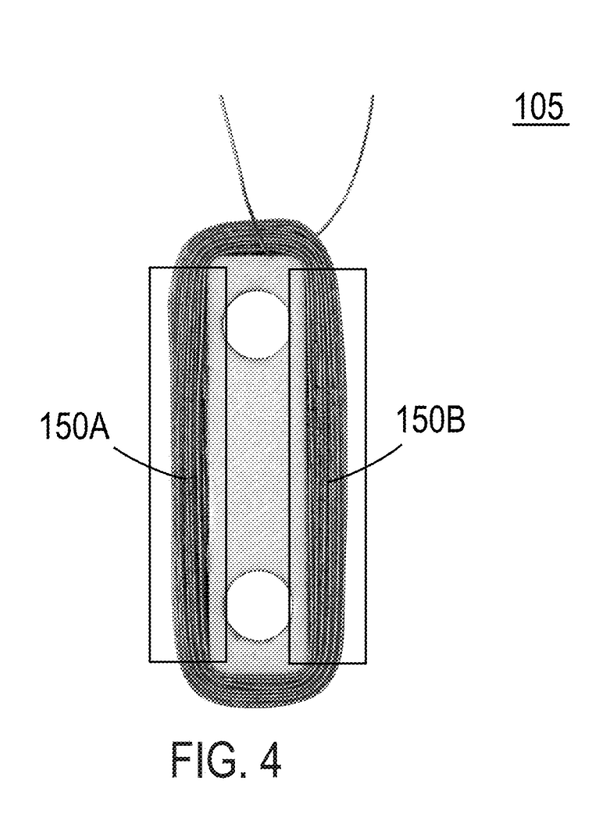
FIG. 4 is an image of the exemplary conductive coil shown in FIG. 3.

FIG. 4 illustrates the conductive coil 105 of the linear actuator 102 shown in FIG. 3. In this example, the coils of the conductive coil 105 are wound with self-bonding wire. The gage and number of turns is size and application dependent, but a small assembly might use 50 turns of 38 AWG wire with a resistance of about 3.2 ohms by way of example only, although other gages and number of turns may be utilized. In this example, the conductive coil 105 is of rectangular form and includes segments 150A and 150B, as shown in FIG. 4, occupying magnetic fields of opposite polarity, as discussed in further detail below. As shown in FIG. 4, the conductive coil 105 is substantially planar with the at least two segments 150A and 150B of the conductive coil 105 being substantially parallel, although other configurations for the conductive coils may be employed.

Figure 5:
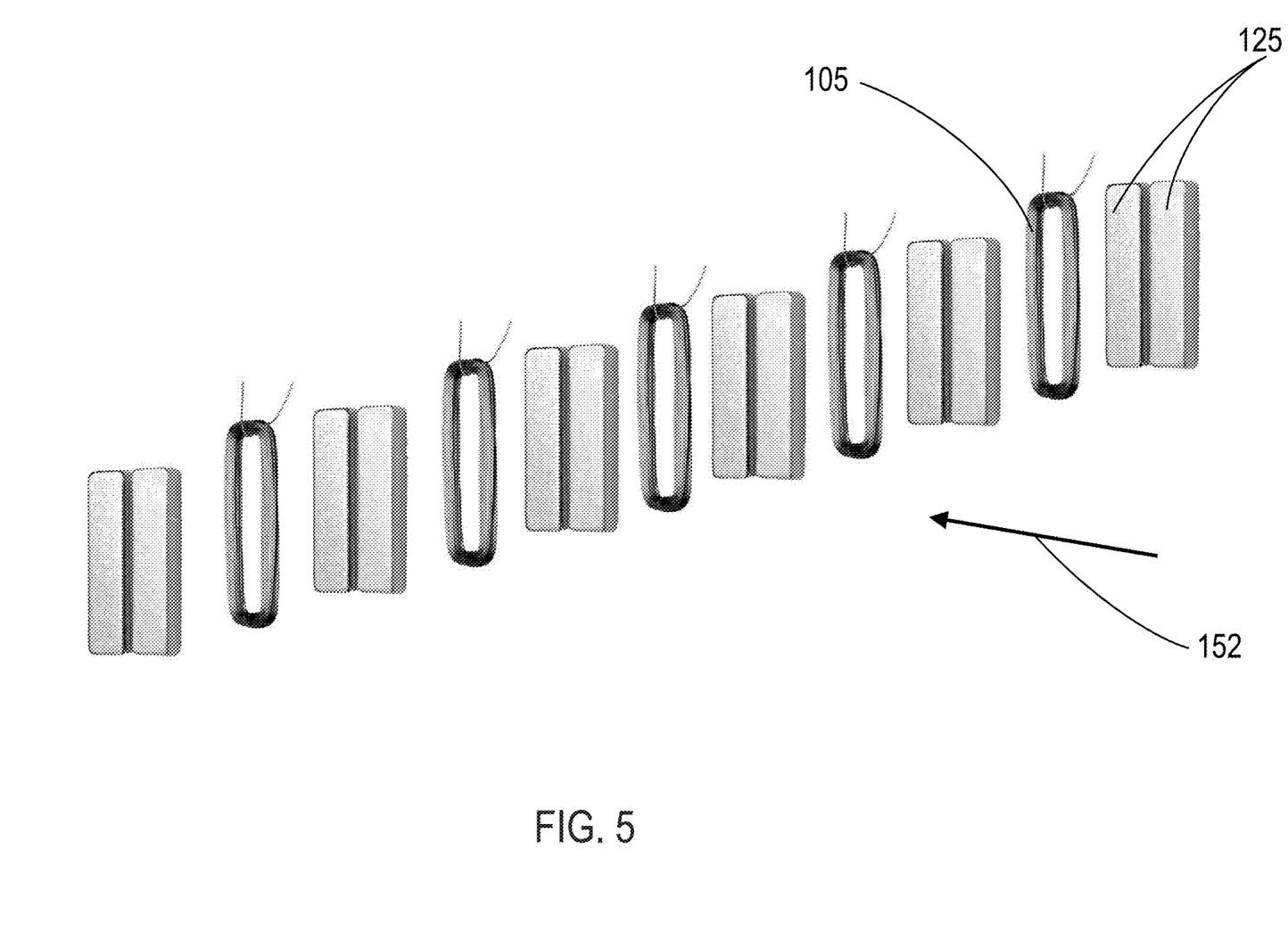
FIG. 5 illustrates a plurality of conductive coils of the actuator assemblies of the present technology interleaved with permanent magnets in a shared magnetic field.
Figure 6:
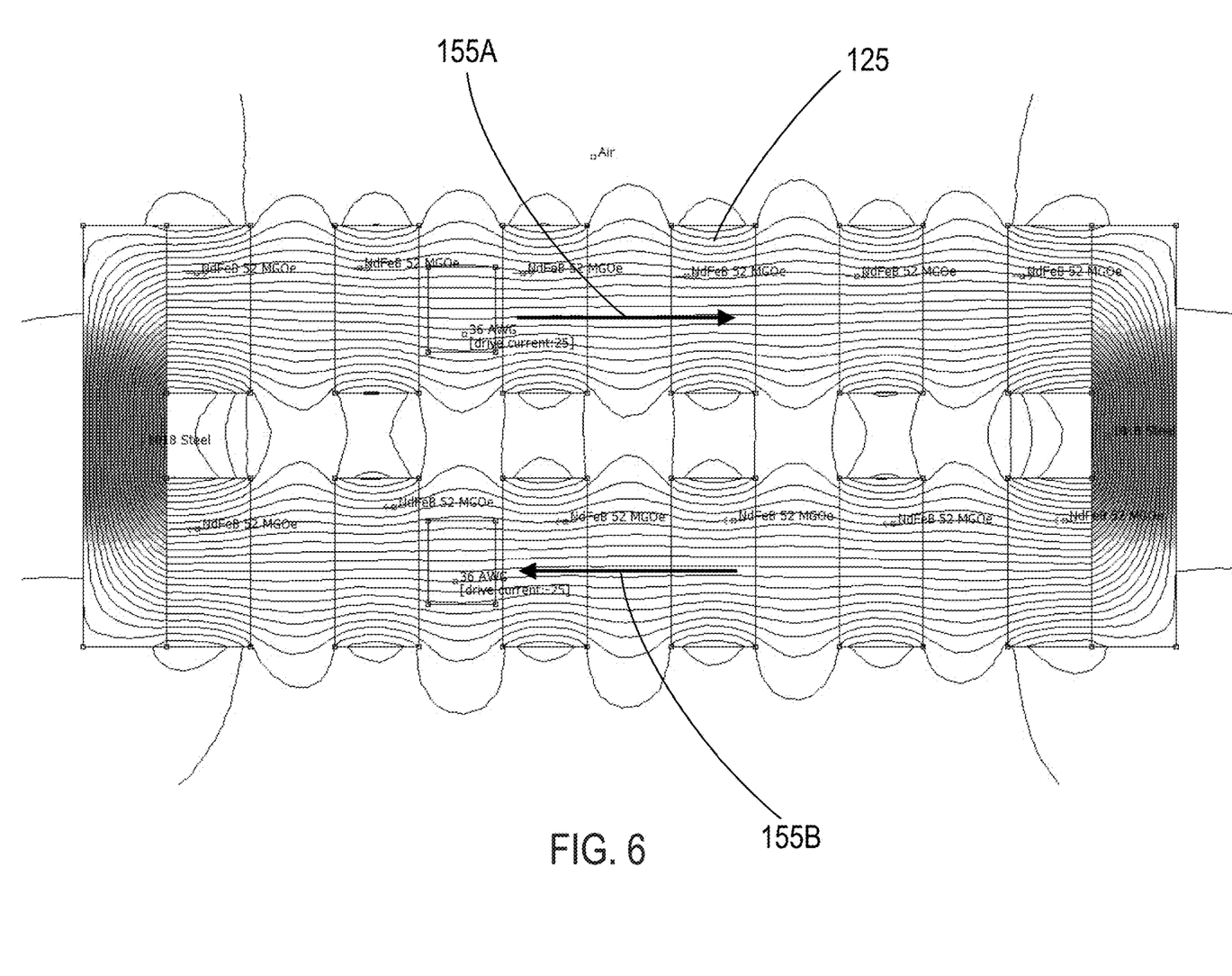
FIG. 6 is an illustration of the results of computer simulation showing magnetic field lines that interact with the conductive coils in the arrangement shown in FIG. 5.

As discussed above, the present technology may be employed with any number N of linear actuators 102 provided by conductive coils 105. Referring to FIG. 5, five exemplary conductive coils 105 of the N linear actuators 102 of actuator assembly 100 are interleaved with permanent magnets 125 such that both poles of a given magnet influence the conductive coil 105 located on either side of the permanent magnet 125. FIG. 6 is a computer simulation showing the magnetic field lines that interact with the N conductive coils 105 (shown in FIG. 5), viewing from the side shown as the direction 152 in FIG. 5. In this example, for N conductive coils 105, 2N+2 permanent magnets 125 are interleaved to surround the N number of coils 105. In this configuration, the permanent magnets 125 are oriented to present opposite polarity fields 155A and 155B to the N conductive coils 105 (shown in FIG. 6). The conductive coils 105 are configured in a rectangular form, as shown in FIG. 4, such that the two winding coil segments 150A and 150B orthogonal to the direction of travel are influenced by respective positive and negative magnetic fields 155A and 155B from the interleaved permanent magnets 125 (shown in FIG. 6). In this manner both coil segments 150A and 150B produce an additive force in the desired direction. Each of the N conductive coils 105 includes its own supporting coil frame 135, movable inside guides 115 (as shown in FIG. 1)

relative to the magnetic fields. Typically, the magnetic fields 155A and 155B are orthogonal to the coil segments 150A and 150B and parallel to the actuation axis.

Figure 7:
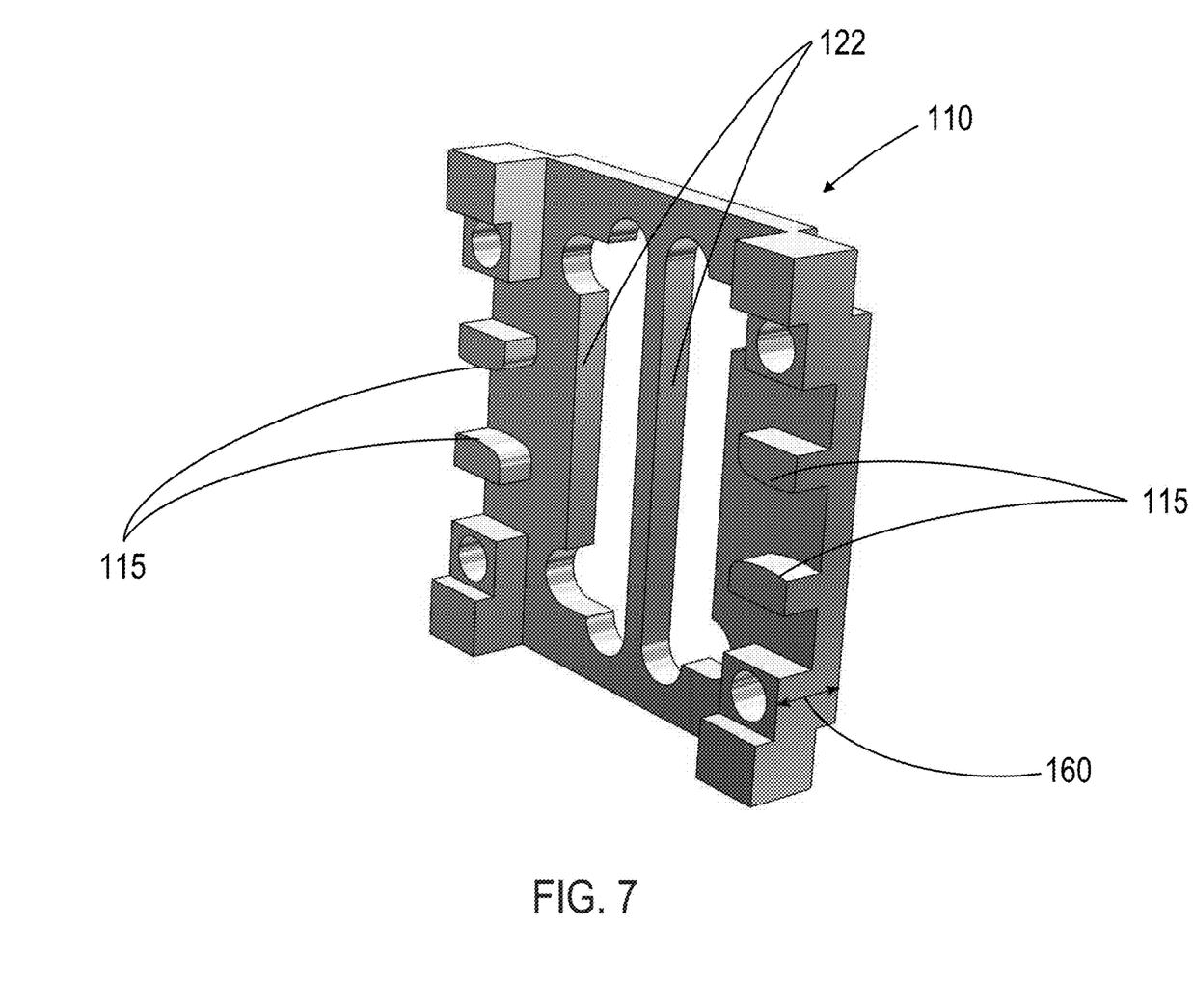
FIG. 7 is a perspective view of an exemplary nesting frame for mounting the permanent magnets for use with the exemplary actuator assembly of the present technology.

In this example, each of the permanent magnets 125 in the actuator assembly 100 is positioned in a nesting magnet frame 110. Referring now to FIG. 7, a perspective view of an exemplary nesting magnet frame 110 for mounting the permanent magnets 125 for use with the exemplary actuator assembly 100 of the present technology. The permanent magnets 125 of the exemplary electromechanical actuator assembly 100 of the present technology are bonded into the mounting areas 122 on the magnet frame 110, as shown in FIG. 7. These magnet frames 110 nest together to form the magnetic structure of the electromechanical actuator assembly 100.

Referring now to FIG. 7, the nesting magnet frames 110 has a thickness 160. In one example, a plurality of nesting magnet frames 110 are utilized in the actuator assembly 100. The nesting magnet frames 110 are optionally produced in two or more variations for the thickness dimension 160, allowing for selective assembly of nesting magnet frames having different thicknesses. The magnet frames 110 are fabricated with two or more slightly different thicknesses 160, allowing for selective assembly to achieve the desired total tolerance of the actuator assembly 100. This becomes increasingly important with increasing values of N, i.e., larger numbers of conductive coils 105. Though not essential to operation, in some examples, a small steel plate is attached across the permanent magnets 125 at each end of the actuator assembly 100 to close the magnetic loop and reduce stray magnetic fields. This plate can double as the mounting flange of the magnetic assembly.

Referring now back to FIG. 1, an exemplary driver board 230 is coupled to the flexible printed circuit board 130 that is connected to each of the N conductive coils 105 of the linear actuators 102 of the electromechanical actuator assembly 100 is illustrated. The driver board 230 is placed near the conductive coils 105 of the linear actuators 102 to reduce resistive losses in the wiring and flexible printed circuits 130. In this example, a loop is placed in the flexible printed circuits 130 to reduce stress, increasing the mean time between failures for the electromechanical actuator assembly 100. The loop geometry is also used to bias the load 140, such as a valve by way of example, in the desired start-up state. In one example, where the load 140 is a sliding valve, the manifold pressure 190 will hold the valve sliding element 182 in position between pulses.

Figure 8:
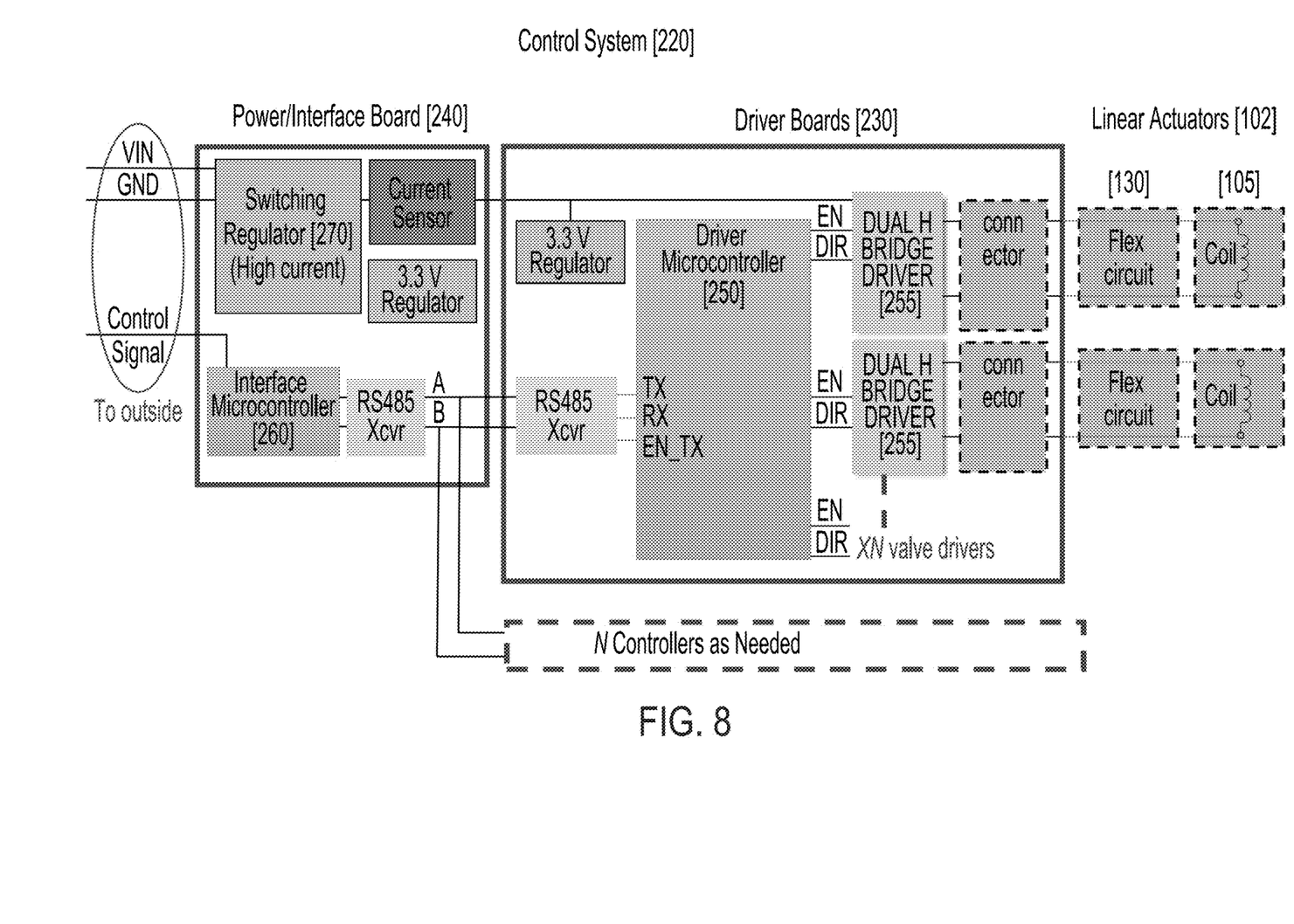
FIG. 8 is an exemplary control circuit block diagram for a control system for controlling the exemplary actuator assembly.

FIG. 8 is a block diagram of an exemplary control system 220 of the actuator assembly 100. In this example, the control system 220 is configured for efficiently controlling forty loads 140, such as sliding valves, although the present technology may be employed with any number of linear actuators 102 configured to drive a corresponding number of loads 140. In this example, the control system 220 is a multi-processor electronic control system that facilitates controlling large number of actuators efficiently with a minimal number of control/interface signals.

The control system 220 includes a power/interface board 240, with a switching regulator 270 that coverts the voltage VIN from a voltage source to the voltage needed by the driver boards 230 at a high enough current to supply as many conductive coils 105 as can be actuated simultaneously. It also contains an interface microcontroller 260 that provides serial communications between an outside control source and each of the driver boards 230.

The exemplary circuit demonstrates RS485 communications used to communicate between the power/interface board 240 and the driver boards 230 via 2-wire differential signals providing resilience to any noise generated by switching on/off the conductive coils, although other communication methods could be used.

The voltage source (VIN) connected to the power/interface board 240 can be a battery supply or any power source that supplies enough power to operate the control system 220 with the desired number of simultaneously actuated conductive coils 105. The switching regulator will convert the input voltage to the voltage needed by the driver boards 230.

Each driver board 230 contains a driver microcontroller 250, RS485 transceivers, dual half-bridge drive circuitry 255 for each output, and interconnects, although the driver boards 230 may include other elements. The driver boards 230 are programmed to apply a current pulse to the N conductive coils 105 lasting several milliseconds to actuate each conductive coil 105 at the supplied voltage. The polarity will determine the direction of travel. Other drive waveforms and timing can be used to control acceleration and deacceleration, permitting higher speed operation of the electromechanical actuator assembly 100.

The driver microcontroller 250 generates the drive signals in response to instructions from the interface microcontroller 260, although the signal generator system could generate other numbers and types of signals which are provided to other types and numbers of systems or devices. In this example, the drive signal for each dual half-bridge driver 255 is staggered in time to reduce the number of conductive coils 105 on simultaneously and therefore reduce peak current draw from the power supply.

The memory of the driver microcontroller 250 stores the programmed instructions for one or more aspects of the present invention as described herein, although some or all of the programmed instructions could be stored and/or executed elsewhere in or outside of the control system. A variety of different types of memory storage devices could be used.

In one example, the control system 220 is also coupled to one or more position sensors 205 (shown in FIGS. 2A and 2B) to determine a position of the load 140 (such as a sliding valve), although the control system 220 may be coupled to other types and/or numbers of other sensors. In another example, the control system is coupled to one or more force sensors 215 (shown in FIGS. 2A and 2B) to determine the force applied to the load. In either example, a feedback loop may be formed to enable the control system 220 to adjust the force applied to the load 140 in response to the determined force or the determined position of the load 140.

Although an embodiment of the control system 220 with the interface microcontroller 260 and the driver microcontroller 250 is described and illustrated herein, each of these systems could be implemented on any suitable computer system or device or an application specific integrated circuit or other programmable entity. It is to be understood that the systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, application specific integrated circuits, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment. Accordingly, principles and advantages of distributed processing, such as redundancy and replication also can be implemented, as desired, to increase the robustness and performance of the devices and systems of the embodiments. The embodiments may also be implemented on computer system, systems, or other devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

An exemplary operation of the actuator assembly 100 will now be described with reference to FIGS. 1-7. Although operation of the linear actuator 102 that acts upon the load 140 (sliding valve), it is to be understood that the operation may be employed for a plurality of linear actuators 102 employed in the actuator assembly 100 described herein.

A voltage (VIN) is applied from a voltage source, such as battery supply, by way of example only. The switching regulator 270 of the power/interface board 240 coverts the voltage (VIN) from the voltage source to the voltage needed by the driver boards 230 at a high enough current to supply as many conductive coils 105 as can be actuated simultaneously.

The driver boards 230 are programmed to apply a current pulse to the N conductive coils 105 lasting several milliseconds to actuate each conductive coil 105 at the supplied voltage. In this example, the driver microcontroller 250 generates the drive signals in response to instructions from the interface microcontroller 260. In this example, the drive signal for each dual half-bridge driver 255 is staggered in time to reduce the number of conductive coils 105 on simultaneously and therefore reduce peak current draw from the power supply. The dual half-bridge drivers 255 provide the drive signals to the linear actuators 102 through the flexible printed circuits 130 to the conductive coils 105. The polarity will determine the direction of travel. Other drive waveforms and timing can be used to control acceleration and deacceleration, permitting higher speed operation of the electromechanical actuator assembly 100.

The drive signals cause the linear actuators 102 to act on the load 140, such as the sliding valve as shown in FIGS. 2A and 2B. For example, the linear actuator 102 can be coupled to the sliding element 182 of the valve to cover or uncover angled passages 185A and 185B in the valve plate 112. The sliding element 182 incorporates a pocket 195 such that flow can occur between adjacent passages 185A and 185B of the angled port when the sliding element 182 is moved to a position surrounding the passages 185A and 185B as shown in FIG. 2A when the linear actuator 102 is activated to one location. When the linear actuator is activated to another location as shown in FIG. 2B, the flow can occur between inlet passage 185C and passage 185A.

In one example, the control system 220 receives position information from the one or more position sensors 205 (shown in FIGS. 2A and 2B) to determine a position of the load 140 (such as a sliding valve). The linear actuator 102 may then be operated based on the obtain position data to move the linear actuator 102 to another position. In another example, the control system 220 receives force data for the linear actuator 102 from the one or more force sensors 215 (shown in FIGS. 2A and 2B) to determine the force applied to the load 140. The control system 220 can adjust the force applied to the load 140 in response to the determined force on the load 140.

Accordingly, this technology, as illustrated and described with the example herein, provides a number of advantages including providing a small actuator assembly that provides for a high packing density and high-speed operation.

Having thus described the basic concept of the technology, it will be apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the inventions are limited only by the following claims and equivalents thereto.

What is claimed is:

1. An electromechanical actuator assembly comprising:
   one or more conductive coils each positioned in a movable supporting frame configured to be coupled to a load, wherein each of the one or more conductive coils are positioned in a substantially planar configuration with at least two segments of each of the one or more conductive coils substantially parallel to one another;
   a pair of permanent magnets located on each side of each of the one or more conductive coils, wherein the pair of permanent magnets located on each side of each of the one or more conductive coils are oriented to provide opposite polarity magnetic fields to each of the one or more conductive coils, wherein the pair of permanent magnets located on each side of the one or more conductive coils are positioned to provide magnetic fields that are substantially orthogonal to a plane defined by the one or more conductive coils and each of the magnetic fields interacts with the at least two substantially parallel segments of the one or more conductive coils;
   a plurality of magnetic frames configured to support the pair of permanent magnets located on each side of each of the one or more conductive coils, wherein the one or more conductive coils comprise a plurality of conductive coils;
   a drive circuit coupled to the each of one or more conductive coils and configured to supply a drive current from a current source to each of the one or more conductive coils; and
   a controller coupled to each of the one or more conductive coils through the drive circuit, wherein the controller is configured to independently control the drive current supplied to each of the one or more conductive coils to provide movement of the supporting frame to provide a force to the load, based on the opposite polarity magnetic fields and the drive current, wherein the movement of the supporting frame is in proportion to an amplitude and polarity of the drive current.

2. The electromechanical actuator assembly as set forth in claim 1, wherein the supporting frame is positioned in one or more guides configured to restrict the movement of the support frame applied to the load to a single axis of travel.

3. The electromechanical actuator assembly as set forth in claim 1, wherein the supporting frame includes a mating element that couples the supporting frame to the load.

4. The electromechanical actuator assembly as set forth in claim 1, wherein the load is a sliding element of a slide valve having passages that describe an angle, wherein the sliding element is configured to selectively seal the passages of the slide valve.

5. The electromechanical actuator assembly as set forth in claim 4, wherein contact between the sliding element of the valve and a surface of the slide valve containing the passages is maintained by a manifold pressure of the slide valve.

6. The electromechanical actuator assembly as set forth in claim 4, wherein the sliding element of the slide valve has a contoured pocket configured to minimize discontinuities and resistance to fluid flow.

7. The electromechanical actuator assembly as set forth in claim 1 further comprising:
one or more position or force sensors coupled to the controller and configured to provide position data or force data for the load, wherein the controller is configured to control the drive current based on the position data or the force data for the load.

8. The electromechanical actuator assembly as set forth in claim 1, wherein the plurality of magnetic frames define a thickness for the electromechanical actuator assembly.

9. The electromechanical actuator assembly as set forth in claim 8, wherein at least one of the plurality of magnetic frames has a different thickness from the others of the plurality of magnetic frames.

10. The electromechanical actuator assembly as set forth in claim 1, wherein the controller is configured to independently control each of the plurality of conductive coils.

11. A method for making an electromechanical actuator assembly, the method comprising:
providing one or more conductive coils each positioned in a movable supporting frame configured to be coupled to a load, wherein each of the one or more conductive coils are positioned in a substantially planar configuration with at least two segments of each of the one or more conductive coils substantially parallel to one another;
providing a pair of permanent magnets located on each side of each of the one or more conductive coils, wherein the pair of permanent magnets located on each side of each of the one or more conductive coils are oriented to provide opposite polarity magnetic fields to each of the one or more conductive coils, wherein the pair of permanent magnets located on each side of the one or more conductive coils are positioned to provide magnetic fields that are substantially orthogonal to a plane defined by the one or more conductive coils and each of the magnetic fields interacts with the at least two substantially parallel segments of the one or more conductive coils;
providing a plurality of magnetic frames configured to support the pair of permanent magnets located on each side of each of the one or more conductive coils, wherein the one or more conductive coils comprise a plurality of conductive coils;
coupling a drive circuit coupled to the each of one or more conductive coils and configured to supply a drive current from a current source to each of the one or more conductive coils; and
coupling a controller coupled to each of the one or more conductive coils through the drive circuit, wherein the controller is configured to independently control the drive current supplied to each of the one or more conductive coils to provide movement of the supporting frame to provide a force to the load, based on the opposite polarity magnetic fields and the drive current, wherein the movement of the supporting frame is in proportion to an amplitude and polarity of the drive current.

12. The method as set forth in claim 11, wherein the supporting frame is positioned in one or more guides configured to restrict the movement of the support frame applied to the load to a single axis of travel.

13. The method as set forth in claim 11, wherein the supporting frame includes a mating element that couples the supporting frame to the load.

14. The method as set forth in claim 11, wherein the load is a sliding element of a slide valve having passages that describe an angle, wherein the sliding element is configured to selectively seal the passages of the slide valve.

15. The method as set forth in claim 14, wherein contact between the sliding element of the valve and a surface of the slide valve containing the passages is maintained by a manifold pressure of the slide valve.

16. The method as set forth in claim 14, wherein the sliding element of the slide valve has a contoured pocket configured to minimize discontinuities and resistance to fluid flow.

17. The method as set forth in claim 11 further comprising:
coupling one or more position or force sensors to the controller, the one or more position or force sensors configured to provide position data or force data for the load, wherein the controller is configured to control the drive current based on the position data or the force data for the load.

18. The method as set forth in claim 11, wherein the plurality of magnetic frames define a thickness for the electromechanical actuator assembly.

19. The method as set forth in claim 18, wherein at least one of the plurality of magnetic frames has a different thickness from the others of the plurality of magnetic frames.

20. The method as set forth in claim 11, wherein the controller is configured to independently control each of the plurality of conductive coils.

* * * * *